United States Patent
Nakamura et al.

[11] Patent Number: 5,949,048
[45] Date of Patent: Sep. 7, 1999

[54] CARD PROCESSING APPARATUS CAPABLE OF KEEPING CARD REMOVAL SPEED NEAR CONSTANT

[75] Inventors: Katsushi Nakamura; Isamu Haginowaki, both of Atsugi, Japan

[73] Assignee: Anritsu Corporation, Tokyo, Japan

[21] Appl. No.: 08/901,211

[22] Filed: Jul. 28, 1997

[30] Foreign Application Priority Data

Aug. 8, 1996 [JP] Japan .................................. 8-225952

[51] Int. Cl.⁶ .................................. G06K 7/00; G06K 7/06
[52] U.S. Cl. ........................ 235/439; 235/441; 235/486; 235/492
[58] Field of Search ................................ 235/439, 435, 235/441, 483, 486, 492

[56] References Cited

U.S. PATENT DOCUMENTS

| | | | |
|---|---|---|---|
| 4,717,817 | 1/1988 | Grassi et al. | 235/441 |
| 4,810,863 | 3/1989 | Kachi et al. | 235/441 |
| 4,873,425 | 10/1989 | Langlais et al. | 235/441 |
| 4,904,852 | 2/1990 | Mita et al. | 235/479 |
| 5,012,078 | 4/1991 | Pernet | 235/441 |
| 5,079,413 | 1/1992 | Sasaki | 235/479 |
| 5,202,551 | 4/1993 | Parrer et al. | 235/486 |
| 5,508,501 | 4/1996 | Fujimoto et al. | 235/441 |

*Primary Examiner*—Donald Hajec
*Assistant Examiner*—Daniel St. Cyr
*Attorney, Agent, or Firm*—Frishauf, Holtz, Goodman, Langer & Chick, P.C.

[57] ABSTRACT

A card processing apparatus includes a pivotal member. The pivotal member pivots upon being pressed by the leading end portion of a card inserted through a card insertion port when the leading end portion of the card is inserted to a predetermined insertion depth, the leading end portion of the card is clamped between the pivotal member and an intermediate plate so that the card is locked to be unable to pivot in an opposite direction. A card pressing member is biased to pivot in such a direction that its pressing end portion separates from contact terminals. When the pivotal member pivots in an inserting direction upon insertion of a card, the card pressing member is pressed by the pivotal member to pivot in such a direction that its pressing end portion comes near the contact terminals. In the locked state, the pressing end portion presses the card from the lower surface side to cause external terminals to come into tight contact with the contact terminals. When the leading end portion of the card is removed from a portion between the intermediate plate and the pivotal member, the locked pivotal member is released immediately, so that the card can be removed at a constant speed. The read operation of magnetic information on the card is stabilized without causing an abrupt change in removal speed when removing the card.

10 Claims, 7 Drawing Sheets

CARD PROCESSING APPARATUS CAPABLE OF KEEPING CARD REMOVAL SPEED NEAR CONSTANT

BACKGROUND OF THE INVENTION

The present invention relates to a card processing apparatus and, more particularly, to a card processing apparatus which receives various types of cards such as a magnetic card having a magnetic stripe, an IC card formed with an IC, e.g., a memory circuit, therein and having external terminals, a magnetic/IC dual-type card, and the like, performs a read/write process for the IC memory in the card while the card is inserted if the received card has an IC, and reads magnetic information from the magnetic stripe when removing the card if the received card has a magnetic stripe.

A conventional card processing apparatus that performs an information read/write process for a magnetic/IC dual-type card and the like described above receives a card manually inserted by the user through the card insertion port until the external terminal portion of the IC memory of the card enters the interior of the apparatus, and presses its contact terminals into contact with the external terminals of the card, so that an information read/write process is performed for the IC memory in the card through the contact terminals. When the card is removed by the user, the apparatus causes the magnetic head to come into contact with the magnetic stripe of the card, so that magnetic information recorded on the magnetic stripe of the card is read by the magnetic head.

Requirements for such a card processing apparatus are as follows: (1) the contact state between the external terminals of the card and the contact terminals in the apparatus should be reliably held; (2) a wrong card should be ejected reliably; and (3) the card removal speed should be kept constant as much as possible.

Of these requirements, requirement (1) is naturally needed for stably and reliably performing a read/write process for the IC memory of the card. Requirement (3) is necessary for stably and reliably reading magnetic information recorded on the magnetic stripe of the card with the magnetic head in the apparatus when removing the card.

Regarding requirement (2), if a wrong card cut shorter than a proper card is completely inserted in the apparatus through the card insertion port for illegal use, this wrong card cannot be pulled out from the outside, and the equipment on which the card processing apparatus is mounted cannot be used. Requirement (2) is necessary for preventing this inconvenience.

Figure 10A:
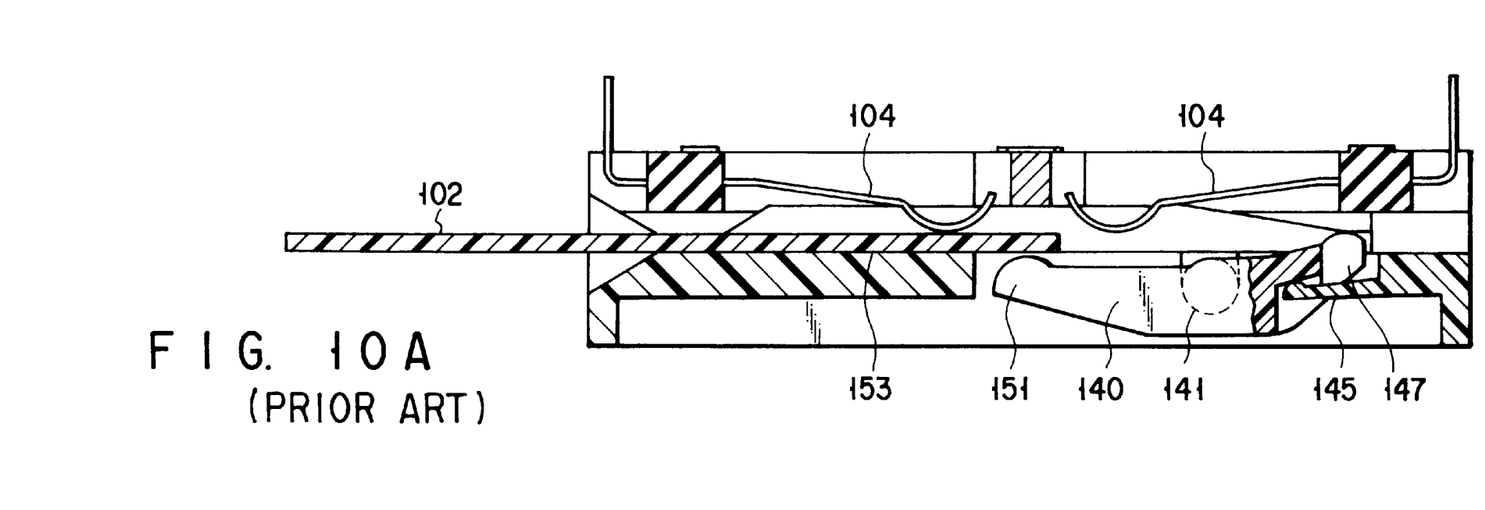
FIGS. 10A and 10B are views for explaining states before and after card insertion of a card processing apparatus according to a conventional technique.
Figure 10B:
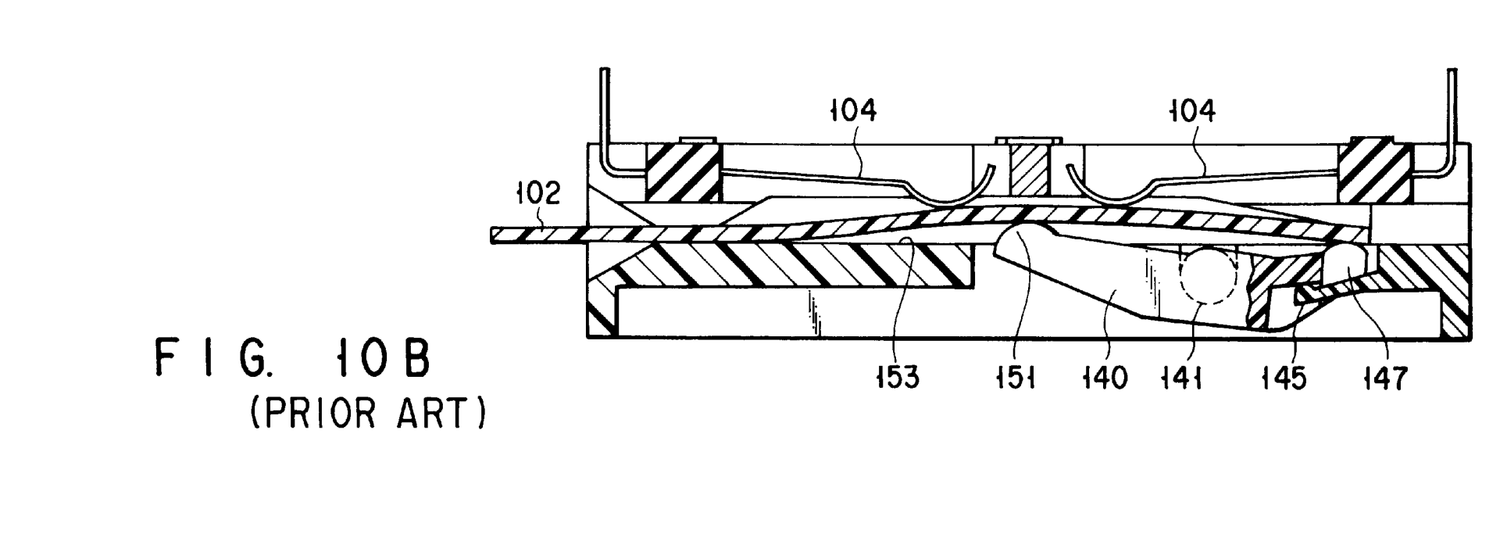

FIGS. 10A and 10B show states before and after card insertion according to IC CARD READER HAVING LEVER THAT BENDS CARD ONTO IC CONTACT disclosed in U.S. Pat. No. 5,012,078 as an example of the conventional card processing apparatus described above.

In the process of inserting an IC card 102 into the apparatus along a guide surface 153 extending long in the apparatus, the leading end portion of the IC card 102 presses down a rear end cam 147 of a lever 140. A front end cam 151 of the lever 140 interlockingly pivots about a pivot 141 as the fulcrum so as to bend, by pressing, the IC card 102 upward. Therefore, the external terminal portion of the IC card 102 can be forcibly brought into contact with contact terminals 104 in the apparatus.

An upward return force is constantly applied to the rear end cam 147 of the lever 140 with a return tongue portion 145 in the apparatus.

The conventional technique disclosed in U.S. Pat. No. 5,012,078 merely satisfies the requirements (1) and (3) described above aiming at handling only proper IC cards and cannot satisfy the requirement (2) described above.

Figure 11A:
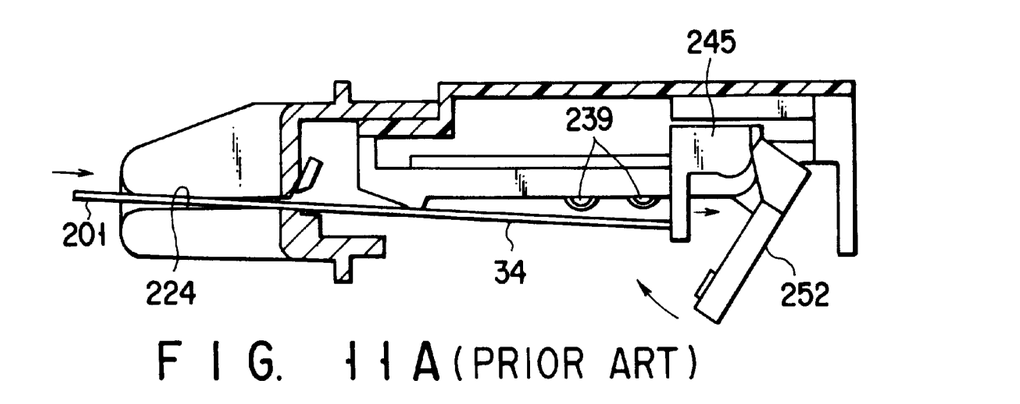
FIGS. 11A and 11B are views for explaining states before and after card insertion of the card processing apparatus according to the conventional technique.
Figure 11B:
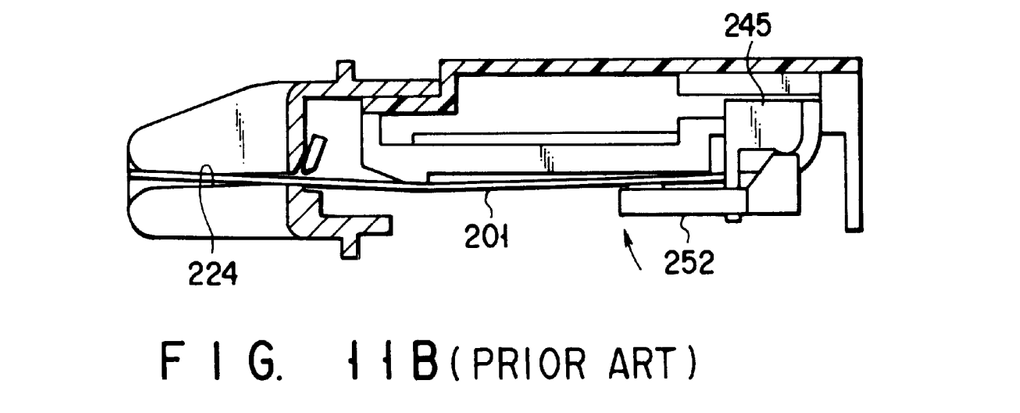

FIGS. 11A and 11B show states before and after card insertion according to IC CARD PROCESSING APPARATUS HAVING FUNCTION FOR CERTAINLY RECEIVING PROPER CARDS AND DISCHARGING WRONG CARDS disclosed in U.S. Pat. No. 5,508,501 as an example of the conventional card processing apparatus described above.

In the process of inserting an IC card 201 along a guide groove 224 formed in the inlet port portion of the apparatus, the leading end portion of the IC card 201 slides a slide member 245 backward. A card pressing member 252 interlockingly pivots in the direction of the arrow shown in FIGS. 11A and 11B to press the IC card 201 upward. Therefore, the external terminal portion of the IC card 201 is forcibly brought into contact with contact terminals 239 in the apparatus.

A large forward return force is constantly applied to the slide member 245 with a pair of springs (not shown), and the slide member 245 is connected to the card pressing member 252 through a cam.

Figure 11C:
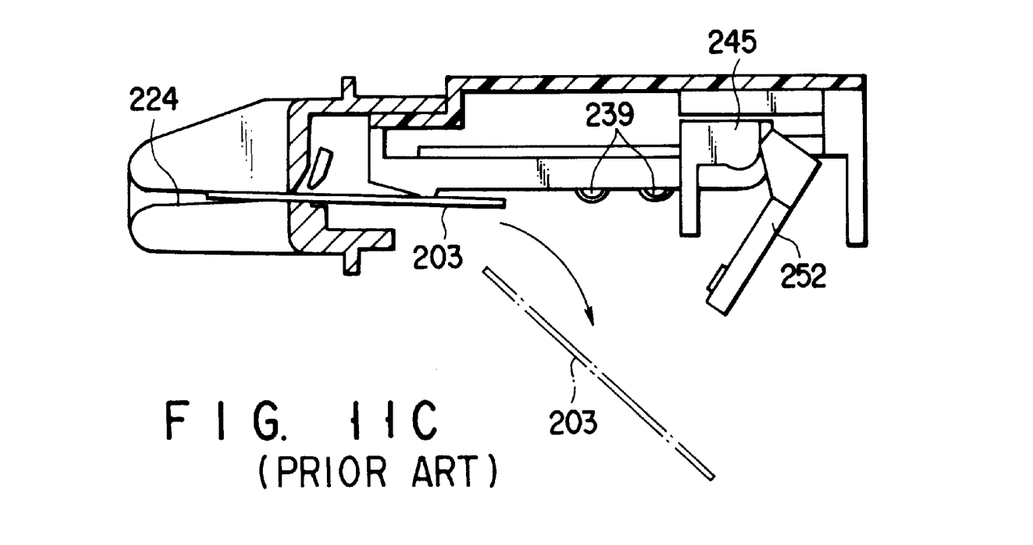
FIG. 11C is a view for explaining a wrong card ejected state.

FIG. 11C shows a wrong card ejected state according to this U.S. Pat. No. 5,508,501.

The lower portion in the apparatus is largely opened. Even if a wrong card 203 cut shorter than the proper card is inserted, before its leading end reaches the slide member 24, it can be ejected from the lower opening portion in the apparatus, as indicated by an alternate long and short dashed line in FIG. 11C.

Concerning this respect, according to U.S. Pat. No. 5,012,078 described above shown in FIGS. 10A and 10B, when a wrong card cut shorter than the proper card is inserted, it stays on the lever 140 and the guide surface 153 extending long in the apparatus to correctly guide the proper card.

The conventional technique disclosed in U.S. Pat. No. 5,508,501 described above merely satisfies the above-described requirements (1) and (2) aiming at handling only proper and wrong cards and cannot satisfy requirement (3) described above.

More specifically, in any of the conventional card processing apparatuses, the external terminals of the IC card and the contact terminals in the card processing apparatus are forcibly pressed to be in reliable contact with each other. When the card is to be manually removed, it is inevitably removed with a strong force. Therefore, it is difficult to remove the card at a near constant speed without suddenly changing of removal speed with which magnetic information can be stably read from the magnetic stripe of the card with the magnetic head in the apparatus.

BRIEF SUMMARY OF THE INVENTION

It is, therefore, an object of the present invention to provide a card processing apparatus which aims at handling a magnetic card, an IC card, an IC/magnetic combined card, and the like, solves the problems of the conventional technique described above, allows to remove the card at a near constant removal speed when removing the card without requiring a strong force, can make reliable the contact state with the external terminals of the card, and can reliably eject a wrong card.

According to an aspect of the present invention, there is provided a card processing apparatus comprising a slot having a card insertion port for receiving a predetermined-size card, a frame having, in a lower surface thereof, an opening for ejecting, by dropping, a card-like foreign member smaller than the predetermined-size card which is inserted through the A card insertion port of the slot, and formed to receive the predetermined-size card which is inserted through the card insertion port, contact terminals which come into contact with external terminals formed on an upper surface of the predetermined-size card to transmit information, a magnetic head for reading information from a magnetic recording portion of the predetermined-size card when the predetermined-size card is being removed from the card processing apparatus, a first pivotal member pivotally mounted on the frame to pivot upon being pressed by a leading end portion of the predetermined-size card which is inserted through the card insertion port, when the leading end portion of the predetermined-size card is inserted to a predetermined insertion depth, the first pivotal member clamping the leading end portion of the predetermined-size card together with the frame, thereby locking the predetermined-size card, and a second pivotal member pivotally mounted on the frame and linked to the first pivotal member, when the first pivotal member locks the card, the second pivotal member abutting against a lower surface of the predetermined-size card with one end thereof to press the card, and causing the external terminals of the card to come into contact with the contact terminals, and when the leading end portion of the predetermined-size card is removed from a portion between the frame and the first pivotal member and the locked predetermined-size card is released, the second pivotal member pivoting in such a direction that the one end thereof separates from the card.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

The outline of the present invention will be described. According to the present invention, there is provided a card processing apparatus which is formed to be able to receive a predetermined-size magnetic/IC dual-type card having one surface formed with external terminals, which has contact terminals to come into contact with the external terminals of the card inserted through a card insertion port, and which reads/writes information from/on the card through the contact terminals, comprising     a frame having an intermediate plate which has, on a lower surface side, an opening for dropping and ejecting a card-like foreign member smaller than the predetermined size when the card-like foreign matter is inserted through the card insertion port, and which supports the contact terminals that are pressed into contact with the external terminals of the card above the inserted predetermined-size card,     a pivotal member which is pivotally mounted on the frame to pivot upon being pressed by a leading end portion of a card inserted through the card insertion port, and when the leading end portion of the card is inserted to a predetermined insertion depth, which clamps the leading end portion of the card together with the intermediate plate and is locked to be unable to move in an opposite direction, and     a card pressing member which is pivotally mounted on the frame while being biased by a biasing means to pivot in such a direction that a pressing end portion separates from the contact terminals, the pressing end portion being pressed by the pivotal member and pivoted to come close to the contact terminals when the pivotal member pivots toward an inserting direction upon insertion of a card, the pressing end portion being pressed by the pivotal member to press the card from a lower surface side so that the external terminals are pressed into contact with the contact terminals in a locked state of the pivotal member when the leading end portion of the card is clamped between the intermediate plate and the pivotal member, and the pressing end portion being pivoted in a direction to separate from the card while the pivotal member is pressed and pivoted by a biasing force of the biasing means in a card removal direction when the leading end portion of the card is removed from the intermediate plate and the pivotal member to release the locked state of the pivotal member.

In this card processing apparatus, when a card having a proper length is inserted through the card insertion port, the leading end portion of the card abuts against the pivotal member.

When the card is further pressed in, the pivotal member presses the card pressing member biased by the biasing means, and pivots while pivoting the card pressing means against the biasing force. For this reason, the card pressing means pivots in accordance with the inserting operation of the card, and the pressing end portion at one end of the card pressing means gradually moves close to the contact terminals mounted on the intermediate plate of the frame and gradually moves toward the lower surface of the inserted card, so that it is substantially in contact with the lower surface of the inserted card.

When the leading end portion of the card is further inserted from a portion near the maximum predetermined insertion depth, the leading end portion of the card is inserted between the intermediate plate and the pivotal member and is clamped between them. The pivotal member is disabled to pivot in the returning direction. The pressing end portion of the card pressing member further pivots from a state wherein it is substantially in contact with the lower surface of the card, and presses the card from the lower surface side to cause the external terminals of the card to come into tight contact with the contact terminals.

In this manner, the leading end of the card having a proper length is clamped between the intermediate plate and the pivotal member, and is held clamped at a portion on the left side of the clamped portion between the pressing end portion of the card pressing member and the contact terminals mounted on the intermediate plate of the frame. Information recorded on the card is then read or information is written on the card.

At the beginning of removal of the card, when a small-length portion of the card clamped in the gap between the intermediate plate and the pivotal member is removed, the pivotal member is enabled to pivot in the direction opposite to the direction in card insertion. With the biasing force of the biasing means, the card pressing means presses the pivotal member in a direction opposite to the direction in card direction, and pivots while pivoting the pivotal member.

This makes it possible to immediately release the lower surface of the card pressed by the pressing end portion of the card pressing member.

Accordingly, a strong force is not required at all from the beginning of card removal, and a load caused by clamping does not substantially act on the card from the beginning to the end of removal.

According to this card processing apparatus, since the load does not abruptly change during removal of the card, even if the card is removed manually, the removal speed does not change abruptly. While the card is being removed, magnetic information recorded on the card can be read at a near constant speed. Therefore, the read operation is stabilized, and the risk of causing erroneous reading can be eliminated.

An embodiment of the present invention based on the above outline will be described with reference to the accompanying drawings.

FIGS. 1 to 8 show an IC card processing apparatus according to an embodiment of the present invention.

Figure 1:
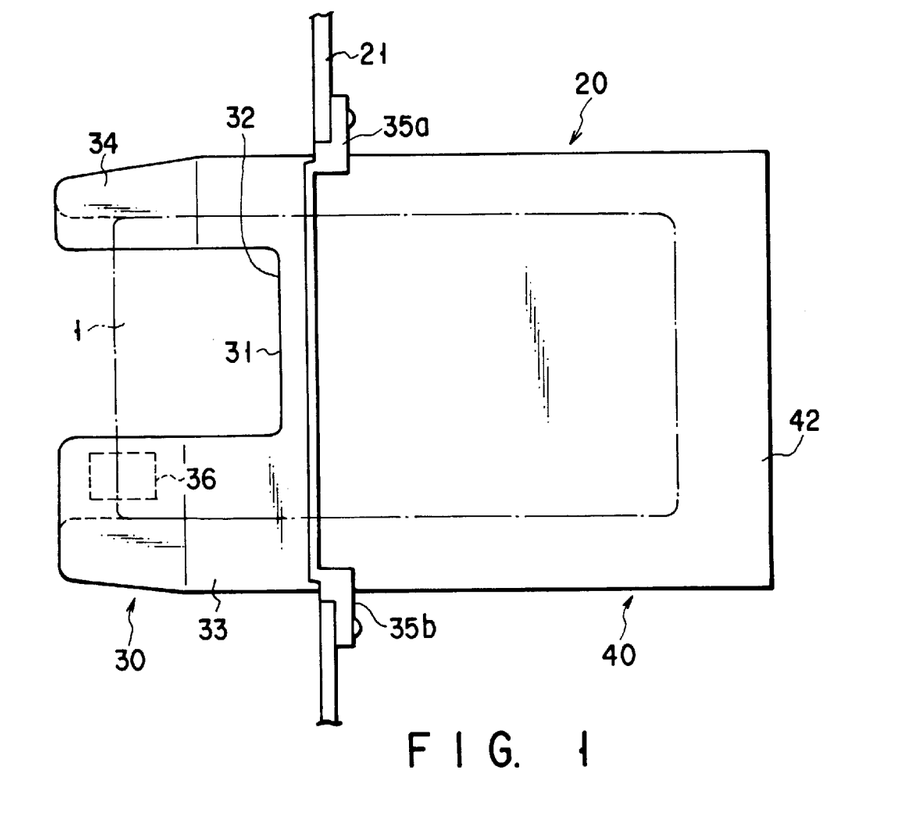
FIG. 1 is a plan view showing a card processing apparatus according to an embodiment of the present invention.

This IC card processing apparatus 20 is mounted on a housing 21 of a pay phone that can be used with a prepaid IC card (a magnetic/IC dual-type card having a magnetic stripe), as shown in FIG. 1. The IC card processing apparatus 20 receives an IC card manually inserted by the user until such a position that allows the card to be removed after use, and rewrites the message rate information recorded on the IC card.

This IC card processing apparatus 20 is constituted by a card slot 30 and a housing 40. The card slot 30 is fixed to project from the housing 21 of the pay phone so that it can receive an IC card inserted from the outside. The housing 40 is fixed to the rear portion of the card slot 30.

The card slot 30 has a substantially channel-like shape when seen from above, is horizontally divided into halves, and has a proximal portion 32, two projecting portions 33 and 34, and flange portions 35a and 35b. A slit-like card insertion port 31 is formed in the front surface of the proximal portion 32 to receive an IC card 1 substantially horizontally. The projecting portions 33 and 34 project forward at the two sides of the proximal portion 32. The flange portions 35a and 35b project from the proximal portion 32 to the two sides.

The gap between the opposing surfaces of the two projecting portions 33 and 34 is smaller than the width of the IC card 1.

Figure 3:
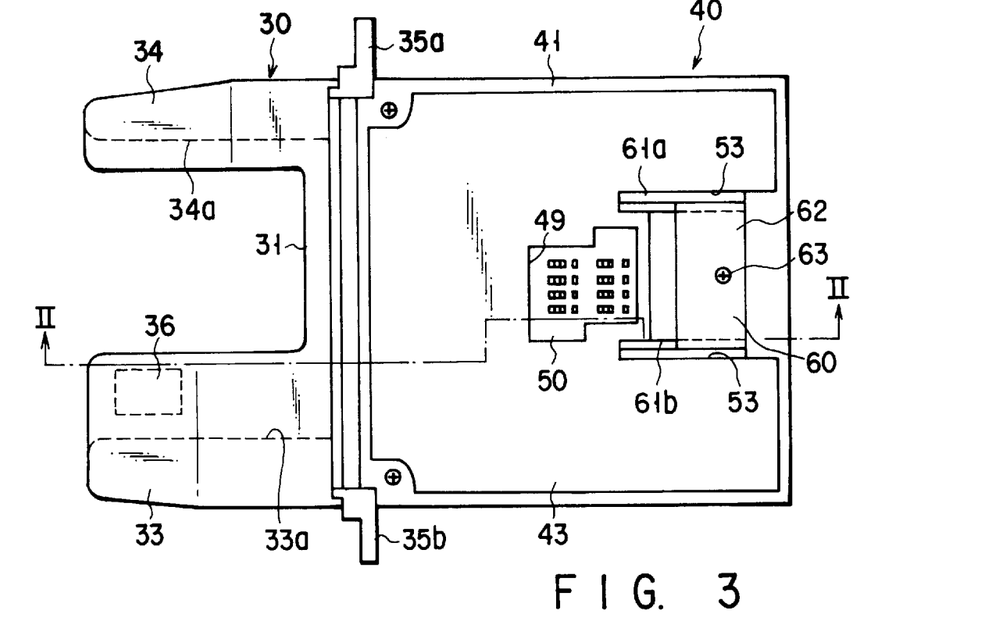
FIG. 3 is a plan view of this embodiment from which a cover and a circuit board are removed.

Guide grooves 33a and 34a are formed in the opposing surfaces of the projecting portions 33 and 34, respectively, as shown in FIG. 3. The guide grooves 33a and 34a are continuous to the card insertion port 31 to horizontally guide the IC card 1 inserted from the front.

A magnetic head 36 is arranged in one projecting portion 33 to oppose the guide groove 33a. When the IC card 1 is being removed, the magnetic head 36 reads magnetic information recorded on the magnetic stripe portion on the lower surface of the IC card 1 passing through the guide groove 33a.

The housing 40 is fixed to the proximal portion 32 of the card slot 30. The flange portions 35a and 35b projecting from the proximal portion 32 are fixed on the inner surface of the housing 21 of the pay phone with screws, so that the entire portion of the IC card processing apparatus 20 is supported by the housing 21.

Figure 2:
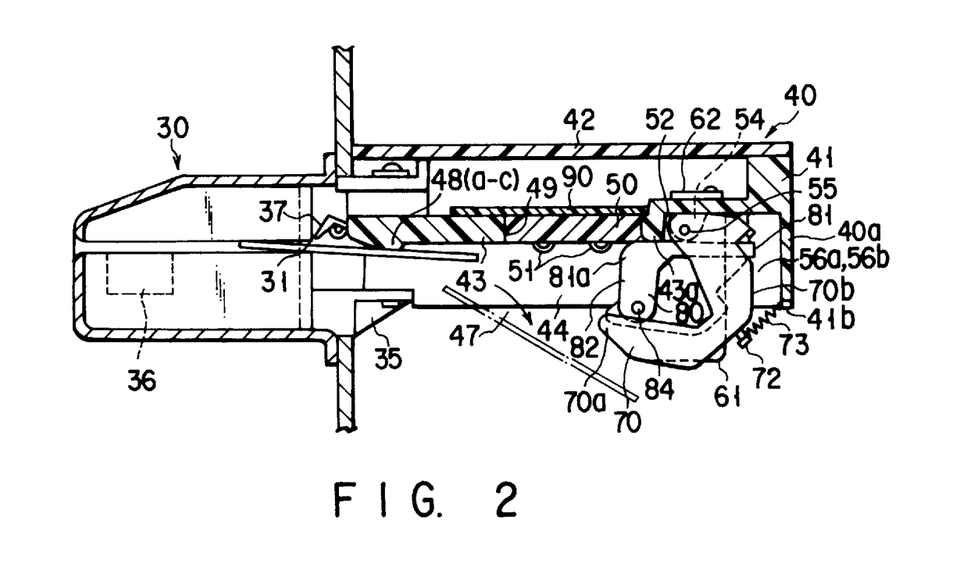
FIG. 2 is a sectional view taken along the line II—II of FIG. 3.

A shutter member 37 is pivotally arranged behind the card insertion port 31, as shown in FIG. 2.

When an IC card having a proper width is inserted while being supported between the guide grooves 33a and 34a of the two projecting portions 33 and 34 of the card slot 30, the shutter lever (not shown) of the shutter member 37 is pivoted as it is moved upward by the proper-width IC card that passes through the guide groove 34a of one projecting portion 34, to open the card insertion port 31. Therefore, forward movement of the proper card is permitted.

Even if a wrong card having a width smaller than the proper width is to be inserted directly in the card insertion port 31, the shutter lever cannot be moved upward, and the card insertion port 31 is kept closed by the shutter member 37, so that forward movement of the wrong card is prohibited.

As shown in FIG. 2, the housing 40 is constituted by a frame 41 fixed to the card slot 30 and a cover 42 fixed to the upper surface of the frame 41.

The frame 41 has a substantially rectangular outer shape, and an intermediate plate 43 that horizontally partitions the interior of the frame 41 is arranged at the intermediate level of the frame 41.

Figure 4:
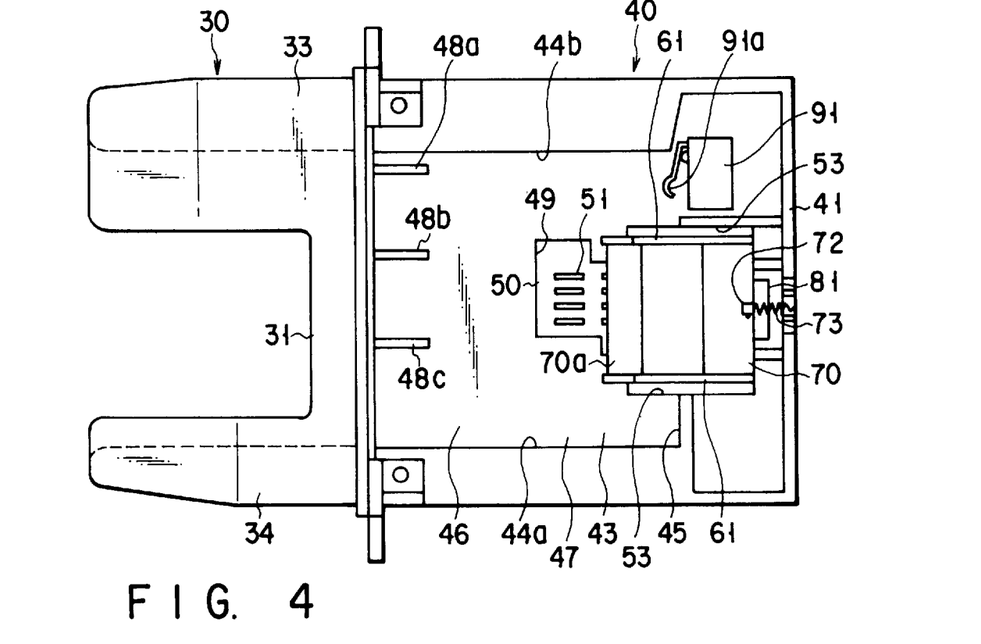
FIG. 4 is a bottom view showing this embodiment.

As shown in FIG. 4, the IC card 1 inserted through the card insertion port 31 is received into a card storage portion 46 surrounded by the lower surface of the intermediate plate 43 of the frame 41, two inner side surfaces 44a and 44b hanging downward from the two sides of the intermediate plate 43, and an end wall portion 45 that abuts against the leading end of the inserted card to prohibit further insertion of the inserted card.

The distance between the two inner side surfaces 44a and 44b constituting the card storage portion 46 is equal to the width of the card insertion port 31. An opening 47 ranging from the lower end of the rear portion of the card slot 30 to the rear end of the intermediate plate 43 is formed in the lower surface of the card storage portion 46, in order to eject a short card or foreign member inserted through the card insertion port 31.

Three tilted projection ridges 48a, 48b, and 48c project from the front end of the lower surface of the intermediate plate 43 to decline downward more on the rear portion.

A terminal plate mounting hole 49 is formed to extend through substantially the central portion of the intermediate plate 43.

A terminal plate 50 is fixed on the terminal plate mounting hole 49 with a screw.

Two rows of four contact terminals 51 are formed on the lower surface of the terminal plate 50 to respectively come into contact with the external terminals of the IC card 1.

Each contact terminal 51 is formed into substantially a V shape by bending a conductive member (e.g., phosphor bronze) having spring properties. One end side of the contact terminal 51 is fixed by the terminal plate 50 and the other end side thereof is inserted in the corresponding terminal hole (not shown) formed in the terminal plate 50, so that the contact terminal 51 is supported by the terminal plate 50. When pressed from below, the contact terminals 51 move upward while elastically deforming, and resist against the pressure from below with their elastic restoration force.

The tilted projection ridges 48a, 48b, and 48c guide the leading end side of the card inserted through the card insertion port 31 in a direction to separate from the lower surface of the intermediate plate 43, so that the contact terminals 51 projecting downward from the lower surface of the intermediate plate 43 will not be deformed by the leading end of the IC card 1.

Behind the terminal plate mounting hole 49, a recessed portion 52 is formed in the lower surface of the intermediate plate 43, as shown in FIG. 2.

Figure 5:
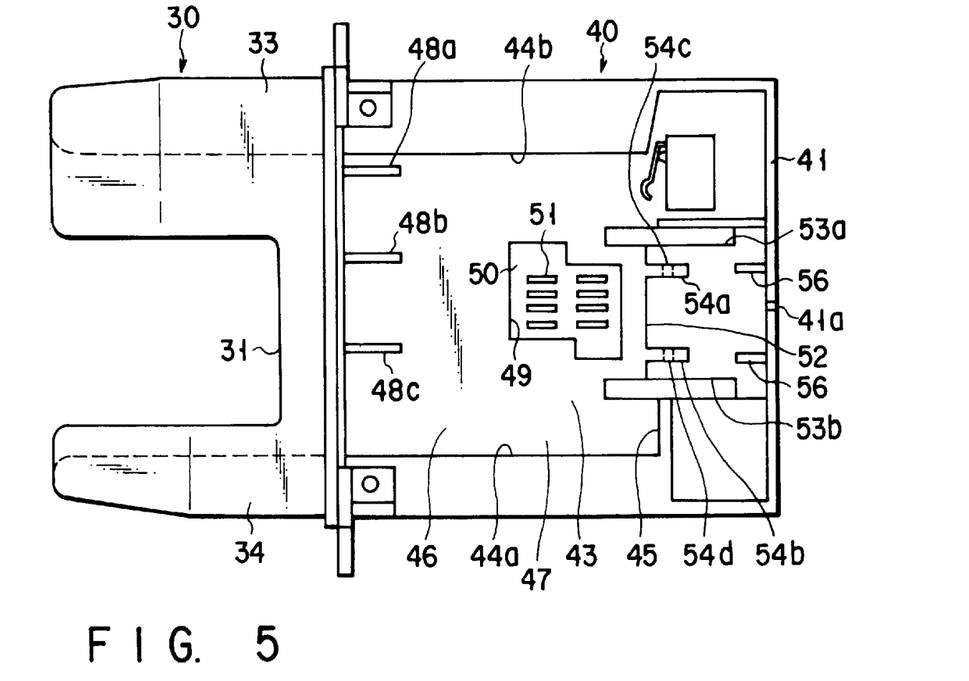
FIG. 5 is a bottom view of FIG. 4 from which a support metal fixture, a card pressing member, and a pivotal member are removed.

As shown in FIG. 5, elongated holes 53a and 53b extend to be parallel to the two sides of the recessed portion 52.

Figure 6:
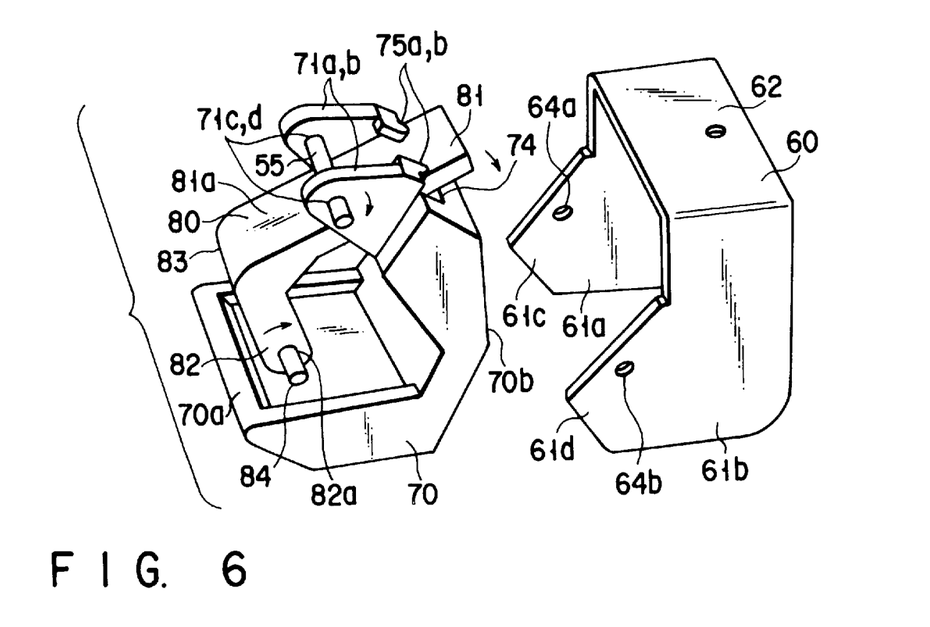
FIG. 6 is a perspective view showing the support metal fixture, the card pressing member, and the pivotal member.

A proximal portion 62 of a substantially channel-like support metal fixture 60 shown in FIG. 6 is fixed on the upper surface of the intermediate plate 43 with a screw 63, so that two parallel side support plates 61a and 61b of the support metal fixture 60 project to the lower surface side of the intermediate plate 43 through the elongated holes 53a and 53b of the intermediate plate 43 (see FIG. 3).

Projecting portions 61c and 61d are formed on the lower portions of the side support plates 61a and 61b to project forward with a gradually increasing projection width. Shaft holes 64a and 64b are respectively formed in the projecting portions 61c and 61d.

As shown in FIG. 5, a pair of support arms 54a and 54b respectively having shaft holes 54c and 54d project downward from the two sides of the recessed portion 52 of the intermediate plate 43.

A card pressing member 70 is pivotally mounted on a shaft 55 (see FIG. 6) inserted through the respective shaft holes 54c and 54d of the pair of support arms 54a and 54b.

As shown in FIG. 6, the card pressing member 70 has a substantially U-shaped side surface. The card pressing member 70 is pivotally mounted on the support arms 54a and 54b while the shaft 55 extends through shaft holes 71c and 71d of two arms 71a and 71b formed on the two sides of one end of the card pressing member 70.

As shown in FIG. 2, a pressing end portion 70a at the other end of the card pressing member 70 is biased in a direction to separate from the terminal plate 50 by a spring 73 having two ends respectively caught by a spring hook 72 on the rear surface portion of the card pressing member 70 and a catching hole 41b in an edge plate 41a on the rear end side of the frame 41. A rear surface portion 70b of the card pressing member 70 abuts against a pair of stoppers 56a and 56b projecting from the edge plate 41a of the frame 41 (see FIG. 4).

A recessed engaging portion 74 is formed between the two arms 71a and 71b of the card pressing member 70. A flat plate-like engaging body 81 of a pivotal member 80 (to be described later) is inserted in this recessed engaging portion 74 to engage with it. A pair of retaining projections 75a and 75b respectively project from the opposing inner surfaces of the arms 71a and 71b, so that the engaging body 81 inserted in the recessed engaging portion 74 to engage with it will not remove upward.

The pivotal member 80 is formed into an L shape to have a width slightly smaller than the distance between the two opposing arms 71a and 71b of the card pressing member 70, and is constituted by the flat plate-like engaging body 81 and a card receiving portion 82 vertically projecting from one end of the engaging body 81.

The outer boundary portion between the engaging body 81 and the card receiving portion 82 forms an arcuated curved portion 83.

A shaft 84 to be mounted in the respective shaft holes 64a and 64b of the side support plates 61a and 61b of the support metal fixture 60 is inserted in a shaft hole 82a at the end portion of the card receiving portion 82 of the pivotal member 80. The pivotal member 80 is pivotally mounted on the side support plates 61a and 61b while its engaging body 81 is inserted in the recessed engaging portion 74 of the card pressing member 70 to engage with it.

The length of the card receiving portion 82 is set to realize the following state. More specifically, as shown in FIG. 2, assume that the card pressing member 70 is pivoted counterclockwise by the biasing force of the spring 73 about the shaft 55 as the center, until its rear surface portion 70b abuts against the stoppers 56a and 56b. Since the engaging body 81 of the pivotal member 80 engages with the recessed engaging portion 74 of the card pressing member 70, the pivotal member 80 is pivoted counterclockwise about the shaft 84 as the center by the pivot motion of the card pressing member 70, so that a proximal portion 81a of the engaging body 81 abuts against a boundary wall surface 43a between the terminal plate mounting hole 49 of the intermediate plate 43 and the recessed portion 52.

Figure 7:
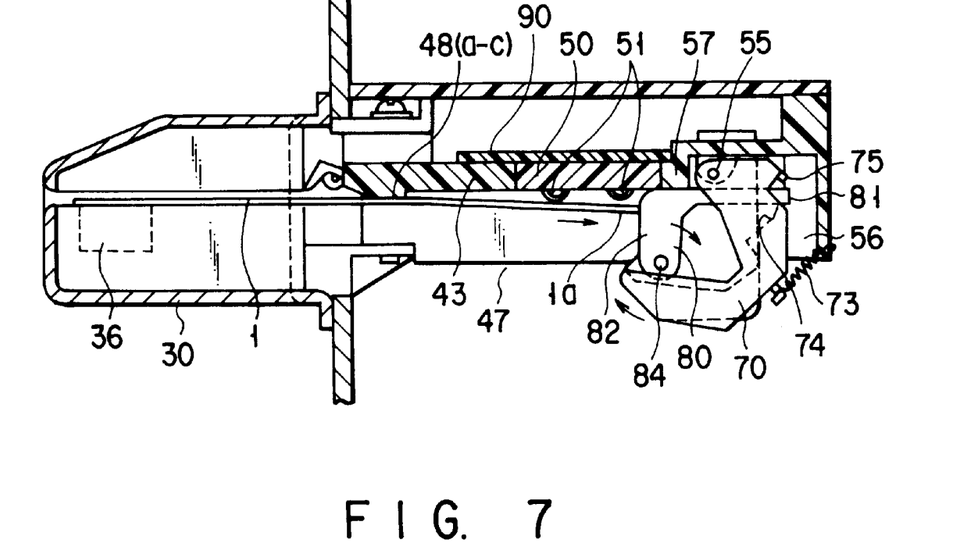
FIG. 7 is a view for explaining the operation of this embodiment.
Figure 8:
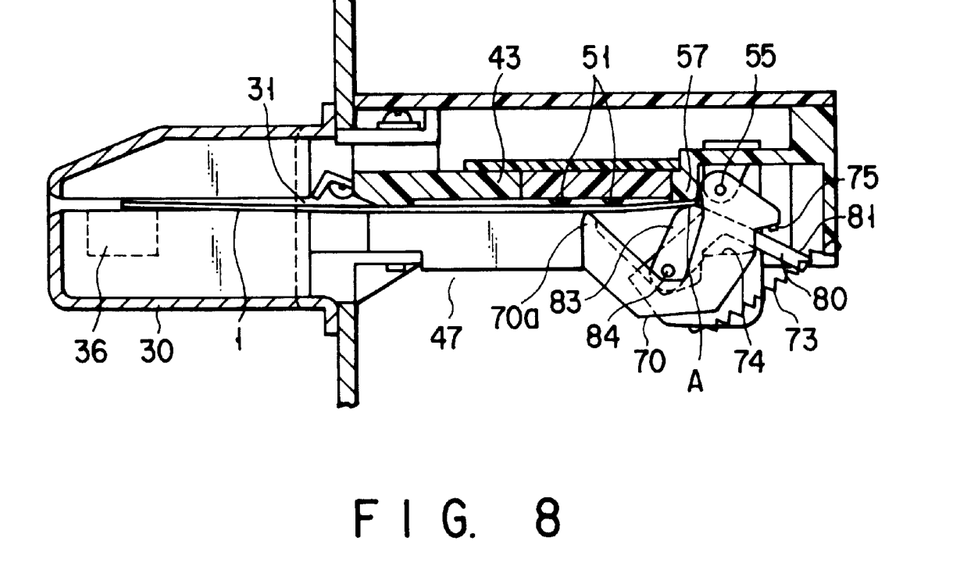
FIG. 8 is a view for explaining the operation of this embodiment.

Accordingly, as shown in FIG. 7, a leading end portion 1a of the inserted IC card 1 abuts against the card receiving portion 82 of the pivotal member 80. When the IC card 1 is further pressed in, as shown in FIG. 8, the pivotal member 80 pivots clockwise about the shaft 84 as the center.

This allows the engaging body 81 to press and pivot the card pressing member 70 clockwise against the biasing force of the spring 73, and its pressing end portion 70a presses the IC card 1 upward from the lower surface. Due to the clockwise pivot motion of the pivotal member 80, a gap A almost corresponding to the thickness of the card is formed between the curved portion 83 of the pivotal member 80 and a boundary wall surface 57 of the intermediate plate 43.

When the card is pressed until its leading end portion 1a abuts against the end wall portion 45 of the frame 41, the leading end portion 1a is inserted in the gap A, and the restoration force generated by the spring 73 acts to pivot the pivotal member 80 counterclockwise. Thus, the leading end portion 1a is locked as it is clamped between the curved portion 83 of the pivotal member 80 and the boundary wall surface 57.

A circuit board 90 is fixed on the upper surface of the intermediate plate 43. The circuit board 90 is connected to one end side of the contact terminals 51.

As shown in FIG. 4, a microswitch 91 is mounted on the lower surface of the rear portion of the circuit board 90 to serve as a sensor for detecting that the IC card 1 is inserted until the end wall portion 45 of the frame 41. The microswitch 91 is turned on when its movable piece 91a is pressed by the leading end of the card 1.

The contact terminals 51 and the microswitch 91 are connected to the controller (not shown) of the pay phone through the circuit board 90.

In addition to normal communication control, this controller determines insertion/removal of a card from the ON/OFF state of the microswitch 91, and rewrites the message rate information on the insertion card through the contact terminals 51.

The operation of the IC card processing apparatus 20 having the above arrangement will be described.

Assume that the user manually inserts a proper IC card 1 in the card insertion port 31 with its two sides being supported by the guide grooves 33a and 34a of the two projecting portions 33 and 34 on the two sides of the card slot 30. The side portion of the IC card 1 moves the shutter lever (not shown) upward to retreat the shutter member 37 upward from the card insertion port 31. The user can further move the IC card 1 into the card storage portion 46.

As shown in FIG. 7, the card that has moved the card storage portion 46 passes below the contact terminals 51 as it is slightly moved downward by the tilted projection ridges 48a, 48b, and 48c, and its leading end portion 1a abuts against the card receiving portion 82 of the pivotal member 80.

When the IC card 1 is further inserted, the pivotal member 80 pivots clockwise about the shaft 84 as the center. The engaging body 81 of the pivotal member 80 presses and allows the card pressing member 70 to pivot clockwise against the biasing force of the spring 73, and its pressing end portion 70a moves the IC card 1 upward from the lower surface, as shown in FIG. 8.

The clockwise pivot motion of the pivotal member 80 forms a gap A almost corresponding to the thickness of the card between the curved portion 83 of the pivotal member 80 and the boundary wall surface 57 of the intermediate plate 43.

When the card 1 is further moved until its leading end portion 1a abuts against the end wall portion 45 of the frame 41, the leading end portion 1a is inserted in this gap A.

In this state, the restoration force generated by the spring 73 acts to pivot the pivotal member 80 counterclockwise. The leading end portion 1a of the IC card 1 is locked as it is clamped between the curved portion 83 of the pivotal member 80 and the boundary wall surface 57.

As a result, the external terminals 2 on the upper surface of the IC card 1 are strongly held in tight contact with the contact terminals 51 of the terminal plate 50.

In this state, the movable piece 91a of the microswitch 91 is pressed by the leading end portion 1a of the IC card 1, so that the microswitch 91 is turned on.

When the ON state of the microswitch 91 is detected, the read operation of the call unit information stored in the memory of the IC card 1 and deduction of the used call units are performed through the contact terminals 51.

The operation of removing the IC card 1 after the communication or the like is ended will be described.

At the beginning of removal of the IC card 1, when the short portion (within 3 mm) of the leading end portion 1a of the IC card 1 clamped in the gap between the boundary wall surface 57 and the pivotal member 80 is removed, the pivotal member 80 is enabled to pivot counterclockwise.

Then, with the biasing force of the spring 73, the card pressing member 70 presses the engaging body 81 with its recessed engaging portion 74 to press the pivotal member 80 counterclockwise in the opposite direction to the direction in card insertion, and pivots while pivoting the pivotal member 80.

This allows immediate release of the lower surface of the IC card 1 pressed by the pressing end portion 70a of the card pressing member 70.

Upon removal of the IC card 1, the microswitch 91 is turned off, and simultaneously the card pressing member 70 is pivoted by the biasing force of the spring 73 counterclockwise until its rear surface portion 70b abuts against the stoppers 56a and 56b. The pivotal member 80 also pivots counterclockwise to return to the state shown in FIG. 7 wherein the proximal portion 81a of the engaging body 81 abuts against the boundary wall surface 57.

In the card processing apparatus described above, when the card is inserted, the pivotal member 80 serving as the lock lever rotates, and the card pressing member 70 serving as a press lever linked to the pivotal member 80 presses the card, so that the external terminals 2 of the IC card 1 are brought into contact with the contact terminals 51.

In this mechanism, the card is locked by the thickness of the card. Since the lever ratio is large, it is predicted that the pressure on the IC contact portion may sometimes change depending on variations in thickness of the card, variations in components, wear, and the like.

Modifications will be described in which this mechanism is imparted with elasticity to absorb the variations as described above, so that a change does not occur in the pressure on the IC contact portion.

Figures 9A, 9B:
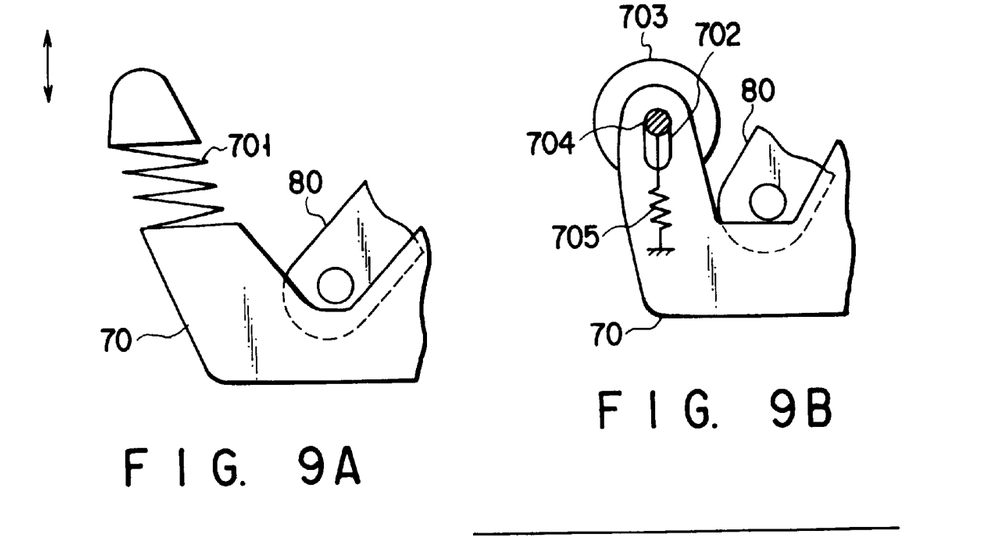
FIGS. 9A to 9E are views showing the arrangements of the main parts of modifications of the present invention.

FIG. 9A shows a modification in which a spring portion 701 is arranged near the distal end portion of a card pressing member 70.

FIG. 9B shows a modification in which a shaft 704 of a roller 703 is inserted in an elongated hole 702 formed near the distal end portion of a card pressing member 70, and a spring 705 is locked on the shaft 704.

In the modifications of FIGS. 9A and 9B, the distal end portion of the card pressing member 70 is substantially imparted with elasticity, so that variations in thickness of the card or wear can be absorbed, thereby preventing a change in pressure at the IC contact portion.

Figure 9C:
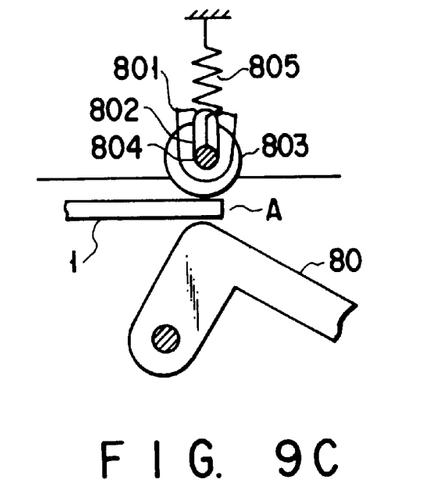

FIG. 9C shows a modification in which, in order to impart elasticity to a pivotal member 80, a shaft 804 of a roller 803 is inserted in an elongated hole 802 of a support member 801 formed in a portion that forms a gap A above the pivotal member 80 where the card 1 is inserted, and a spring 805 is locked on the shaft 804.

Figure 9D:
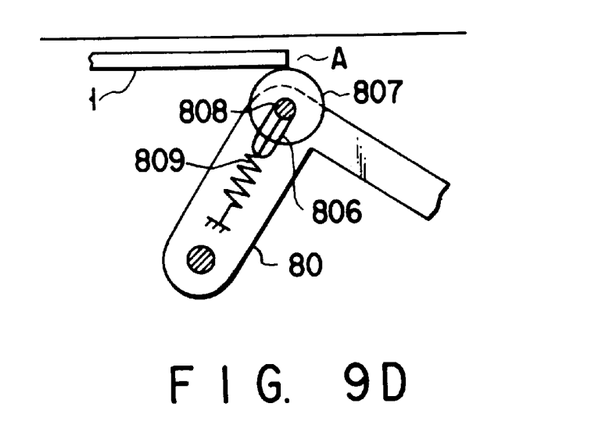

FIG. 9D shows a modification in which a shaft 808 of a roller 807 is inserted in an elongated hole 806 formed in a pivotal member 80, and a spring 809 is locked on the shaft 808.

In the modifications of FIGS. 9C and 9D, the pivotal member 80 is substantially imparted with elasticity, so that variations in thickness of the card or wear is absorbed, thereby preventing a change in pressure on the IC contact portion.

Figure 9E:
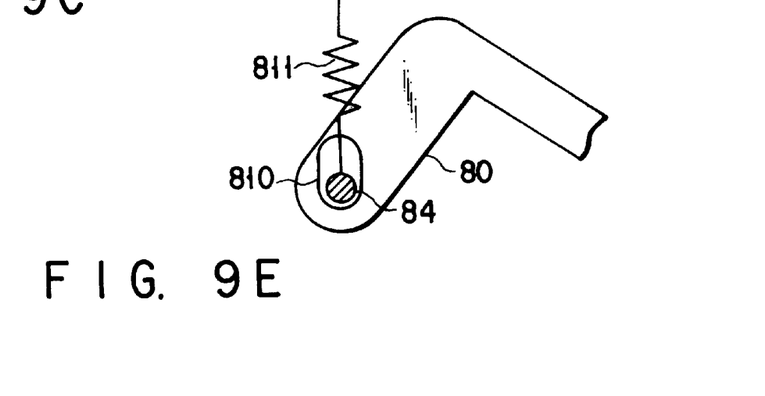

FIG. 9E shows a modification in which a rotating shaft 84 of a pivotal member 80 is inserted in an elongated hole 810, and a spring 811 is locked on the rotating shaft 84.

In the modification of FIG. 9E, the rotating shaft 84 of the pivotal member 80 has a degree of freedom. When the pressure on a card 1 applied by a card pressing member 70 reaches the limit, the rotating shaft 84 of the pivotal member 80 moves downward to absorb variations in card or the like, thereby eliminating an influence caused by the variations to act on the pressure.

In the present invention, although the pivotal member 80 and the card pressing member 70 are linked to each other, they pivot independently of each other about the two shafts 84 and 55 that are independent of each other. Therefore, a large lever ratio can be obtained with a small volume.

Since the pivotal member 80 and the card pressing member 70 are linked to each other through these two shafts 84 and 55, a sufficiently large pressure can be applied to the IC contact portion during card loading and, in card removal, the load can be removed from the beginning of card removal.

This arrangement also contributes to maintaining the opening in the lower portion in the apparatus large, and enables reliable ejection of the wrong card.

More specifically, the present invention can satisfy all of the requirements (1), (2), and (3) described above required for a card processing apparatus of this type.

In this respect, in U.S. Pat. No. 5,012,078 described above, a lever having a uniaxial arrangement with a pivot and occupying a large volume is used. Due to the presence of the guide surface, all of the requirements (1), (2), and (3) that are described above as in the present invention cannot be satisfied, i.e., the requirement (2) cannot be satisfied.

In U.S. Pat. No. 5,508,501 described above, although the slide member and the card pressing member are linked to each other with a small volume, since the apparatus substantially has a uniaxial arrangement, a large load is necessary, and the requirement (3) described above cannot be satisfied.

As described above, in the card processing apparatus according to the present invention, in card removal, a strong force is not required at all from the beginning of IC card removal, and a load caused by clamping does not substantially act on the card from the beginning to the end of removal.

Accordingly, in the card processing apparatus of the present invention, since the load does not abruptly change during removal of the card, even if the card is removed manually, the removal speed does not change abruptly. While the card is being removed, magnetic information recorded on the IC card can be read at a near constant speed by the magnetic head 36. The read operation is thus stabilized, and the risk of causing erroneous reading can be eliminated.

At the beginning of card removal, the clamped IC card is released immediately. Therefore, damage to the contact terminals 51 and the IC card 1 is decreased.

As shown in FIG. 2, if a card having a length shorter than that of the proper card is manually inserted through the card insertion port 31, its leading end does not reach the pivotal member 80, and the card drops due to its own weight and is ejected through the opening 47 in the lower surface.

In the above embodiment, the present invention is applied to an IC card processing apparatus in and from which the user inserts and removes a card manually. However, the present invention can similarly be applied to an IC card processing apparatus which has a mechanism of conveying an inserted card between the card insertion port and the card storage portion. A card whose read/write process is ended is ejected through the card insertion port or the card ejection port.

In the above embodiment, the card processing apparatus performs a read/write process for a prepaid IC card. However, the present invention can similarly be applied to an IC card processing apparatus which reads information from an ID card that identifies the cardholder, and from cards, e.g., a magnetic card, an IC card, a magnetic/IC dual-type card, and the like serving as various types of cards that have records such as transactions, card usage, and the like together in with identification of the cardholder.

As has been described above, according to the card processing apparatus of the present invention, at the beginning of removal of the card, when a short portion of the card clamped in the gap between the intermediate plate and the pivotal member is removed, the pivotal member is enabled to pivot in the direction opposite to the direction in card insertion. With the biasing force of the biasing means, the card pressing means presses the pivotal member in a direction opposite to the direction in card insertion, and pivots while pivoting the pivotal member.

This allows immediate release of the lower surface of the card pressed by the pressing end portion of the card pressing member.

Therefore, a strong force is not required at all from the beginning of removal, and a load caused by clamping does not substantially act on the card from the beginning to the end of removal.

Accordingly, in the card processing apparatus of the present invention, since the load does not abruptly change during removal of the card, even if the card is removed manually, the removal speed does not change abruptly. While the card is being removed, magnetic information recorded on the card can be read at a near constant speed by the magnetic head. Therefore, the read operation is stabilized, and the risk of causing erroneous reading can be eliminated.

According to the card processing apparatus of the present invention, at the beginning of card removal, the clamped IC card is released immediately. Therefore, damage to the contact terminals and the card is decreased.

As has been described above in detail, according to the present invention, there is provided a card processing apparatus which aims at handling a magnetic card, an IC card, an IC/magnetic dual-type card, and the like, solves the problems of the conventional technique, allows the card to be removed at a near constant removal speed when removing the card, without requiring a strong force, can make reliable the contact state with the external terminals of the card, and can reliably eject a wrong card.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A card processing apparatus comprising
   a slot having a card insertion port for receiving a predetermined-size card,
   a frame formed to receive the predetermined-size card which is inserted through said card insertion port, said frame having a horizontally extending intermediate plate which has, on a lower surface side, an opening for dropping and ejecting a foreign member smaller than the predetermined-size card which is inserted through said card insertion port of said slot, contact terminals arranged on said intermediate plate of said frame to come into contact with external terminals formed on an upper surface of the predetermined-size card so as to transmit information therebetween, a magnetic head for reading information from or writing information on a magnetic recording portion of the predetermined-size card when the predetermined-size card is being removed from said card processing apparatus, a first pivotal member pivotally mounted on said frame to pivot upon being pressed by a leading end portion of the predetermined-size card which is inserted through said card insertion port, said first pivotal member including an arcuated portion for clamping the leading end portion of the predetermined-size card together with the horizontally extending intermediate plate of said frame to thereby lock the predetermined-size card when the leading end portion of the predetermined-size card is inserted to a predetermined insertion depth, and a second pivotal member pivotally mounted on said frame and linked to said first pivotal member, said second pivotal member abutting against a lower surface of the predetermined-size card with one end thereof to press the card and cause said external terminals of the card to come into contact with said contact terminals when said first pivotal member locks the card, and said second pivotal member being biased to pivot in such a direction that said one end thereof separates from the card when the leading end portion of the predetermined-size card is removed from between said frame and said first pivotal member and the locked predetermined-size card is released;

wherein said first and second pivotal members are linked so as to pivot independently from each other on two independent shafts, respectively, thereby obtaining a large lever ratio with a small volume, such that (i) a sufficiently large pressure is applied to said external terminals during card loading, and (ii) a load caused by card clamping can be smoothly released during card removal to thereby enable the magnetic recording portion of the card to be stably accessed by the magnetic head at a constant speed during card removal.

2. The apparatus according to claim 1, wherein said magnetic head is arranged in said slot.

3. The apparatus according to claim 1, wherein the predetermined-size card comprises one of a magnetic card, an IC card, and a magnetic and/or IC dual-type card.

4. The apparatus according to claim 1, wherein said one end of said second pivotal member is elastically deformable.

5. The apparatus according to claim 1, wherein said arcuated portion of said first pivotal member and a portion of said intermediate plate corresponding thereto are elastically deformable relative to each other.

6. The apparatus according to claim 1, wherein a pivot shaft of said first pivotal member has a degree of freedom in a vertical direction.

7. The apparatus according to claim 1, wherein said second pivotal member is formed into a U shape, a first side of said second pivotal member forms said one end, and a second side of said second pivotal member is supported by a pivot shaft and is linked to said first pivotal member.

8. The apparatus according to claim 1, wherein said intermediate plate is formed with at least one projection that guides the predetermined-size card inserted through said slot in a direction so as to be separated from said contact terminals.

9. The apparatus according to claim 1, wherein said slot is formed with a shutter behind said card insertion port for closing said card insertion port, said shutter being pivotal upon insertion of the the predetermined-size card to thereby open said card insertion port of said slot.

10. A card processing apparatus which is formed to be able to receive a predetermined-size magnetic and/or dual-type card having one surface formed with external terminals, which has contact terminals to come into contact with said external terminal of the card inserted through a card insertion port, and which reads/writes information from/on the card through said contact terminals, comprising:

a frame having an intermediate plate which has, on a lower surface side, an opening for dropping and ejecting a foreign member smaller than the predetermined size when the foreign member is inserted through said card insertion port, and which supports said contact terminals that are pressed into contact with said external terminals of the card above said inserted predetermined-size card, a pivotal member which is pivotally mounted on said frame to pivot upon being pressed by a leading end portion of a card inserted through said card insertion port, and which clamps the leading end portion of the card together with said intermediate plate and is locked to be unable to move in an opposite direction when the leading end portion of the card is inserted to a predetermined insertion depth, and a card pressing member which is pivotally mounted on said frame and biased to pivot in such a direction that a pressing end portion separates from said contact terminals, said pressing end portion being pressed by said pivotal member and pivoted to come close to said contact terminals when said pivotal member pivots toward an inserting direction upon insertion of a card, said pressing end portion being pressed by said pivotal member to press the card from a lower surface side so that said external terminals are pressed into contact with said contact terminals in a locked state of said pivotal member when the leading end portion of the card is clamped between said intermediate plate and said pivotal member, and said pressing end portion being pivoted in a direction to separate from the card while said pivotal member is pressed and pivoted by a biasing force of said biasing means in a card removal direction when the leading end portion of the card is removed from said intermediate plate and said pivotal member to release the locked state of said pivotal member;

wherein said card processing apparatus further comprises two independent shafts which link said first and second pivotal members in such a manner that said first and second pivotal members pivot independently from each other, thereby obtaining a large lever ratio with a small volume, such that (i) a sufficiently large pressure is applied to said external terminals during card loading, and (ii) a load caused by card clamping can be smoothly released during card removal to thereby enable the magnetic recording portion of the card to be stably accessed by the magnetic head at a constant speed during card removal.

* * * * *